United States Patent
Jialanella et al.

(10) Patent No.: US 11,186,756 B2
(45) Date of Patent: Nov. 30, 2021

(54) EPOXY-ACRYLIC HYBRID ADHESIVE

(71) Applicant: DOW GLOBAL TECHNOLOGIES LLC, Midland, MI (US)

(72) Inventors: Gary L. Jialanella, Auburn Hills, MI (US); Eric E. Cole, Auburn Hills, MI (US)

(73) Assignee: DDP SPECIALTY ELECTRONIC MATERIALS US, LLC, Wilmington, DE (US)

(*) Notice: Subject to any disclaimer, the term of this patent is extended or adjusted under 35 U.S.C. 154(b) by 254 days.

(21) Appl. No.: 16/485,885

(22) PCT Filed: Jan. 29, 2018

(86) PCT No.: PCT/US2018/015639
§ 371 (c)(1),
(2) Date: Aug. 14, 2019

(87) PCT Pub. No.: WO2018/169609
PCT Pub. Date: Sep. 20, 2018

(65) Prior Publication Data
US 2020/0002587 A1    Jan. 2, 2020

Related U.S. Application Data

(60) Provisional application No. 62/472,905, filed on Mar. 17, 2017.

(51) Int. Cl.
    *C09J 175/16*    (2006.01)
    *C09J 4/06*    (2006.01)
    *C09J 5/00*    (2006.01)

(52) U.S. Cl.
    CPC .............. *C09J 175/16* (2013.01); *C09J 4/06* (2013.01); *C09J 5/00* (2013.01); *C09J 2451/00* (2013.01); *C09J 2463/00* (2013.01); *C09J 2475/00* (2013.01)

(58) Field of Classification Search
    CPC ..... C09J 175/16; C09J 4/06; C09J 5/00; C09J 2451/00; C09J 2463/00; C09J 2475/00; C09J 2301/21; C09J 2301/304; C09J 7/10; C09J 2301/208; C09J 163/00; C09J 175/14; C08L 75/16; C08L 51/04; C08L 63/00; C08G 18/10; C08F 283/10
    See application file for complete search history.

(56) References Cited

U.S. PATENT DOCUMENTS

| | | | |
|---|---|---|---|
| 4,419,496 A | 12/1983 | Henton et al. | |
| 4,467,071 A | 8/1984 | Dawdy | |
| 4,778,851 A | 10/1988 | Henton et al. | |
| 5,112,932 A | 5/1992 | Koenig et al. | |
| 6,660,805 B1 | 12/2003 | Righettini et al. | |
| 6,949,602 B2 | 9/2005 | Gosiewski et al. | |
| 2005/0232996 A1 | 10/2005 | Cremer et al. | |
| 2015/0232719 A1 | 8/2015 | Pfeil et al. | |

FOREIGN PATENT DOCUMENTS

| | | | |
|---|---|---|---|
| CN | 104178075 | 12/2014 | |
| CN | 105713543 | 6/2016 | |
| JP | 59-074177 | 4/1984 | |
| WO | 2008140906 | 11/2008 | |
| WO | 2015084553 | 6/2015 | |
| WO | WO-2015084553 A1 * | 6/2015 | ............. C08G 59/40 |

OTHER PUBLICATIONS

JP59-074177, Machine Translation.

* cited by examiner

*Primary Examiner* — Daniel H Lee
(74) *Attorney, Agent, or Firm* — Hong Xu

(57) ABSTRACT

The invention relates to a two-component adhesive based on hybrid urethane-acrylate epoxies comprising a core/shell rubber demonstrating good T-peel strength. The adhesives are suitable for use in industry, e.g., as adhesives for transportation industry applications.

4 Claims, No Drawings

EPOXY-ACRYLIC HYBRID ADHESIVE

FIELD OF THE INVENTION

The present invention relates to hybrid adhesive compositions comprising epoxy and acrylic functionalities, in particular compositions comprising a urethane-acrylate oligomer and a core shell rubber in an epoxy acrylic adhesive. Said adhesives demonstrate improved T-peel strength.

BACKGROUND OF THE INVENTION

In the transportation industry, adhesives are used in the assembly of various components in which these components are bonded to each other or to other parts of the vehicle. In the assembly process of closures and other components (doors, hoods, deck lids, etc.), some original equipment manufacturers (OEMs) prefer to assemble these panels in a different location than the vehicle assembly line. This requires handling and shipping the closure, and thus the adhesive must afford handling strength via a room temperature curing process quickly, i.e., within 15 to 30 minutes. Also, the adhesive must be able to withstand the high-heat conditions (e.g., 177° C.) of the paint ovens during the assembly of the vehicle. Therefore, the room-temperature curing adhesives with heat resistance, high bond strength, and good failure mode are required for the closure application. A typical method to measure bond strength is the T-peel test.

The choice of adhesive is determined by the application as well as the manufacturing process. Automobile manufacturing adhesives are classified into structural adhesives or elastic adhesives. Structural adhesives are high modulus adhesives while elastic adhesive are low modulus systems.

Structural adhesives are extensively used for providing structural strength-imparting bonds to joined metal and or polymer materials. Structural adhesives are useful for bonding of metal parts in place of or in conjunction with welding or mechanical fastening techniques. Due to the requirement of high strength and modulus, structural adhesive generally belong to the epoxy or polyurethane family. However, exposure to high-heat conditions (i.e., manufacturing and/or painting processes) limit the use of polyurethane adhesives due to their generally poor thermal stability.

Acrylic structural adhesives are extensively used for providing structural strength-imparting bonds to joined metal and or polymer materials. Conventional acrylic structural adhesives typically comprise a mixture of one or more olefinic reactive monomers such as methyl methacrylate and methacrylic acid, toughener(s) and redox initiator system. The toughener(s), which may or may not be reactive, or polymerizable with the reactive monomers. Reactive polymers such as unsaturated polyesters, urethane acrylate pre-polymers may be used to graft onto or crosslink the initiated monomers during polymerization. In addition, fully formulated acrylic structural adhesives typically contain other additives for improving adhesion to substrate materials, environmental resistance, impact strength, flexibility, heat resistance, and the like. Epoxy resins impart improved heat resistance and maybe incorporated into said acrylic adhesive for that purpose.

Epoxy acrylic hybrid adhesives have been shown to attain the rapid cure and heat resistance, for Example see U.S. Pat. No. 6,660,805. However, these systems are typically quite brittle and don't afford required T-peel strengths. Peel strength and failure mode of the current epoxy acrylic structural adhesives leaves room for improvement.

There remains a need for structural adhesives, e.g., for bonding diverse, dissimilar substrates in the automobile industry, which can withstand high-heat conditions as well as demonstrate good bond strength and failure mode.

SUMMARY OF THE INVENTION

The present invention provides a two-component adhesive composition comprising an A-side and a B-side comprising, consisting essentially of, or consisting of: A) the A-side comprising, consisting essentially of, or consisting of: i) an acrylate-capped polyurethane, preferably wherein the acrylate-capped polyurethane is be obtained by reacting a polyol with a multifunctional isocyanate to complete reaction of the isocyanate to obtain a pre-polymer, and capping the pre-polymer with acrylate groups, preferably the acrylate-capped polyurethane component comprises i) a) a first acrylate-capped polyurethane having a Tg equal to or greater than 20° C. and i) b) a second acrylate-capped polyurethane having a Tg equal to or less than −20° C., ii) a core/shell graft copolymer, iii) a phosphorous compound with mono-esters of phosphonic or mono- and diesters of phosphonic and phosphoric acids having one unit of vinyl or allylic unsaturation present, iv) an olefinically-unsaturated carboxylic acid, v) an olefinically-unsaturated carboxylic acid ester, and vi) a reducing agent and B) the B-side comprising, consisting essentially of, or consisting of: i) an epoxy resin, preferably a liquid epoxy resin, ii) an oxidizing agent, iii) a stabilizer, and iv) a filler.

In one embodiment of the composition of the present invention vii) a rheology modifier is included in the A-side or the B-side or in both the A-side and B-side.

The present invention also provides a method of bonding two surfaces comprising: a) combining the A-side and the B-side of the two-component adhesive composition disclosed herein above according to the present invention to form an uncured adhesive; b) applying the uncured adhesive such that it is in contact with a first surface and a second surface; and c) curing the uncured adhesive.

DETAILED DESCRIPTION OF THE INVENTION

Preferred adhesives according to the present invention are 2-component (2K) adhesives. The components of the adhesive include an A-side and a B-side.

The first component of the A-side is (i) an acrylate-capped polyurethane may be made by any method by one of ordinary skill in the art. In a preferred method, it can be made by reacting a polymeric polyol, e.g., multi-functional polyether polyol and isocyanate to completion to obtain a pre-polymer. Preparation of the pre-polymer is preferably aided with a catalyst, e.g., a metal catalyst, preferably a tin catalyst, such as dibutyl tin dilaurate. Percent NCO determines the completion of the reaction. Isocyanate levels range from 2 to 5%. A preferred % NCO is 2 to 2.5%. The pre-polymer may then be end-capped with acrylate using, e.g., an acrylate-containing reagent such as an alkyl acrylate, e.g., hydroxyethyl acrylate, preferably in the presence of a catalyst. The higher the % NCO, the higher the viscosity of the end-capped material. A typical structure of the acrylated capped polyurethane is indicated below.

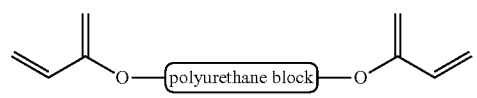

Any polyol suitable for formation of a polyurethane block may be used. Typical polyols are aliphatic. These include groups that contain sequences of linear or branched aliphatic carbon-carbon single bonds and/or non-conjugated double bonds, aliphatic ether bonds, aliphatic amine bonds, and/or other like bonds within their main chain. Some preferred polyols are aliphatic polyether chain that preferably has a molecular weight of at least 1500, more preferably at least 2000, still more preferably at least 3000, and in some embodiments at least 4000, to as much as 20,000, preferably up 12,000 and more preferably up to 8,000 g/mol. The polyether chain may be, for example, a polymer of ethylene oxide, 1,2-propylene oxide, 1,2-butylene oxide, 2,3-butylene oxide, tetramethylene oxide, and the like. An especially preferred polyol is based on poly(1,2-propylene oxide) chain and end-capped with ethylene oxide polymer. The polyols can have a weight of at least 1000 atomic mass units, preferably at least 1500 atomic mass units, more preferably at least 2000 atomic mass units, still more preferably at least 3000 atomic mass units and in some embodiments at least 6000 atomic mass units. The resulting polyol on reaction results in a polymer having a glass transition temperature of no greater than $-20°$ C., preferably no greater than $-35°$ C. and more preferably no greater than $-40°$ C. The polyol functionality is preferably 2 to 5, more preferably 2 to 3. Polyol functionality can be increased, for example, by use of a polyol, preferably glycerol, in the reaction mixture.

Any di- or multi-functional isocyanate may be used, including di-isocyanates, tri-isocyanates, etc. Because excessive branching could lead to a highly viscous or gel product, di-isocyanates are preferred. The polyfunctional isocyanate is preferably the limiting reactant. The polyisocyanate may be, for example, an aromatic polyisocyanate such as diphenylmethane diisocyanate or toluene diisocyanate or an aliphatic polyisocyanate such as isophorone diisocyanate, hexamethylene diisocyanate, hydrogenated toluene diisocyanate, hydrogenated diphenylmethane diisocyanate, and the like. This produces a prepolymer that contains urethane groups and terminal isocyanate groups.

The resulting isocyanate groups of the urethane block (pre-polymer) are then capped with an isocyanate-reactive capping compound having a hydroxyl group and an ene group as described before. The ene groups are provided in the form of terminal $\alpha,\beta$-unsaturated carboxylate groups, such as, for example, acrylate ($-O-C(O)-CH=CH_2$) groups or methacrylate ($-O-C(O)-C(CH_3)=CH_2$) groups. Examples of such isocyanate-reactive capping compounds include, for example, allyl alcohol, vinyl alcohol and hydroxyalkylacrylate and/or hydroxyalkylmethacrylate compounds such as hydroxyethylacrylate and hydroxyethylmethacrylate.

A preferred reagent is hydroxyethyl acrylate, preferably in the presence of a catalyst. The reaction is preferably done with heating. The reaction is preferably run until the isocyanate has completely reacted, such that there is no, or essentially no, remaining free (monomeric) isocyanate. Preferably, reaction progress is monitored by FTIR. The reaction can be considered complete, with no remaining free monomeric isocyanate, upon the disappearance of the —NCO stretch at ~2250 $cm^{-1}$.

The molecular weight (Mw) of the urethane acrylate is not particularly limited, and can be determined by one of ordinary skill in the art for a particular application, using the present disclosure as a guide. The Mw should be high enough that the urethane block soft segments impart suitable elasticity to the adhesive. The Mw should be low enough that the acrylate polymer is not so viscous that it is either difficult to process, or too viscous to combine with the epoxy resin, e.g., to obtain a mixture of suitable proportions and/or viscosity.

In one embodiment of the adhesive composition of the present invention, there are at least two acrylate-capped polyurethanes in the A-side: preferably a first acrylate-capped polyurethane A) i) a) having a Tg equal to or greater than $10°$ C., preferably equal to or greater than $20°$ C., and more preferably equal to or greater than $40°$ C. and a second acrylate-capped polyurethane having a Tg equal to or less than $-0°$ C., preferably equal to or less than $-20°$ C., more preferably equal to or less than $-32°$ C.

Each acrylate-capped polyurethane present (i.e., A) i) a) and A) i) b)) are independently present in the A-side in an amount of equal to or greater than 5 weight percent, preferably equal to or greater than 10 weight percent, and more preferably equal to or greater than 15 weight percent based on the total weight of the A-side. Each acrylate-capped polyurethane are independently present in the A-side in an amount of equal to or less than 25 weight percent, preferably equal to or less than 20 weight percent, and more preferably equal to or less than 15 weight percent based on the total weight of the A-side.

A second component in the A-side is (ii) a core/shell graft copolymers, for example see U.S. Pat. No. 4,778,851, which is incorporated herein in its entirety. As used herein, copolymer means a polymer comprising two or more monomers. The core is a graftable elastomeric material. Preferably, the core is crosslinked to render it substantially insoluble in the epoxy resin phase. The cores are presized and maintain their morphology through curing of the resin. The core can range in size from about 300 Å to about 20,000 Å in diameter. The core generally comprises at least 15 weight percent, preferably at least 50 weight percent and more preferably at least 70 weight percent but less than 90 weight percent of the total weight of grafted rubber particles. The weight of the components of the particles refers to the average weight of the components in the total amount of particles.

Although the cores of the particles are preferably crosslinked to render them insoluble, the cores can in themselves be insoluble in the epoxy resins, such as for example triblock copolymers or long-chain acrylate rubbers. By insoluble in the epoxy resin phase is meant that the elastomeric or rubbery core is rendered insoluble in the epoxy resin phase, or suitable solvents for the resins or inert diluents for the particles. That is, the elastomeric or rubbery component of the grafted rubber particles forms a gel and swells in the resin phase, but does not dissolve. Typically, in such a situation, the percent gel ranges from about 50 to about 95 percent of the weight of the particles, and the swelling index ranges from about 3 to about 50. The elastomeric or rubbery core components include conjugated dienes, acrylate rubbers and interpolymers of the type disclosed in U.S. Pat. No. 4,419,496, which is incorporated herein in its entirety, for example, polymerized butadiene, isoprene and acrylate monomers such as 2-ethylhexyl acrylate, methacrylate, and butyl acrylate, and polysulfides, silicone rubbers, and the like. Preferably, the cores are crosslinked butadiene rubber.

The shell is grafted to the core and may be a homopolymer or interpolymer. The shell performs two functions. One of the functions is to graft to the core, and stabilize the particles in the epoxy resin phase. The amount of shell component is sufficient to effectively stabilize the reactive grafted rubber particles in the epoxy resin phase. This amount can vary depending on the size of the particles. For large particles, a relatively smaller amount of grafted shell is sufficient to stabilize the particles in the resin. For 1000 Å particles, typically, at least about 0.05 to about 0.5 parts, preferably to about 0.1 parts by weight of shell component per 1 part by weight of elastomeric core component will effectively stabilize the grafted rubber particles. Preferred core/shell graft copolymers are the grafted butadiene polymer rubbers having polymers of styrene and (methyl)methacrylate graft polymerized thereto. These are known in the art as MBS graft copolymers.

The core/shell graft copolymer A) ii) is present in the A-side in an amount of equal to or greater than 2 weight percent, preferably equal to or greater than 7 weight percent, and more preferably equal to or greater than 10 weight percent based on the total weight of the A-side. The core/shell graft copolymer A) ii) is present in the A-side in an amount of equal to or less than 20 weight percent, preferably equal to or less than 15 weight percent, and more preferably equal to or less than 12 weight percent based on the total weight of the A-side.

A third component in the A-side is (iii) a phosphorus-containing compound with mono-esters of phosphonic, mono- and diesters of phosphonic and phosphoric acids having one unit of vinyl or allylic unsaturation present. Vinylic unsaturation is preferred. Representative of the phosphorus-containing compounds are, without limitation, phosphoric acid; 2-methacryloyloxyethyl phosphate; bis-(2-methacryloxyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; (α-hydroxy-butene-2 phosphonic acid; 1-hydroxy-1-phenylmethane-1,1-diphosphonic acid; 1-hydroxy-1-methyl-1-disphosphonic acid: 1-amino-1phenyl-1,1-diphosphonic acid; 3-amino-3-hydroxypropane-1,1-disphosphonic acid; amino-tris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyllphosphinic acid and allyl methacryloyloxyethyl phosphinic acid. Preferred phosphorus compounds are 2-hydroxyethylmethacrylate phosphate and phosphonated (meth)acrylic monomer.

The phosphorus-containing compound A) iii) is present in the A-side in an amount of equal to or greater than 0.5 weight percent, preferably equal to or greater than 2 weight percent, and more preferably equal to or greater than 3 weight percent based on the total weight of the A-side. The phosphorus-containing compound A) iii) is present in the A-side in an amount of equal to or less than 10 weight percent, preferably equal to or less than 7 weight percent, and more preferably equal to or less than 4 weight percent based on the total weight of the A-side.

Additionally, the A-side comprises (iv) a carboxylic acid and/or a (v) a carboxylic acid ester having the formula R—COOR$_1$ wherein R is H or a C$_1$ to C$_{18}$ linear or branched, saturated or unsaturated alkyl group and R$_1$ is H or a C$_1$ to C$_{12}$ linear or branched alkyl group. Preferably, the carboxylic acid and/or acid ester is an olefinically-unsaturated carboxylic acid/ester containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group. Olefinically-unsaturated acids of this class and esters thereof include such widely divergent materials as the acrylic acids typified by acrylic acid itself, methacrylic acid, ethacrylic acid, alpha-chloroacrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. A preferred carboxylic acid (iv) is methacrylic acid and a preferred carboxylic acid ester (v) is methyl methacrylate.

The carboxylic acid A) iv) is present in the A-side in an amount of equal to or greater than 0.5 weight percent, preferably equal to or greater than 1.5 weight percent, and more preferably equal to or greater than 2.5 weight percent based on the total weight of the A-side. The carboxylic acid A) iv) is present in the A-side in an amount of equal to or less than 7 weight percent, preferably equal to or less than 5 weight percent, and more preferably equal to or less than 3 weight percent based on the total weight of the A-side.

The carboxylic acid ester A) v) is present in the A-side in an amount of equal to or greater than 30 weight percent, preferably equal to or greater than 40 weight percent, and more preferably equal to or greater than 48 weight percent based on the total weight of the A-side. The carboxylic acid ester A) v) is present in the A-side in an amount of equal to or less than 70 weight percent, preferably equal to or less than 60 weight percent, and more preferably equal to or less than 50 weight percent based on the total weight of the A-side.

The B-side comprises i) an epoxy resin. The epoxy resin preferably comprises one or more materials having an average of at least 1.5, preferably at least 1.8 epoxide groups per molecule, and an epoxy equivalent weight of up to 1000. The epoxy equivalent weight is preferably up to 500, more preferably is up to 250 and still more preferably up to 225. The epoxy resin preferably has up to eight epoxide groups and more preferably has 1.8 to 4, especially 1.8 to 3, epoxide groups per molecule.

The epoxy resin is preferably a liquid at room temperature, to facilitate easy mixing with other components. However, it is possible to use a solid (at 25° C.) epoxy resin, particularly if the epoxy resin is soluble in the polyene compound, and/or if the epoxy resin is provided in the form of a solution in a suitable solvent.

Among the useful epoxy resins include, for example, polyglycidyl ethers of polyphenolic compounds, by which it is meant compounds having two or more aromatic hydroxyl (phenolic) groups. One type of polyphenolic compound is a diphenol (i.e., has exactly two aromatic hydroxyl groups) such as, for example, resorcinol, catechol, hydroquinone, biphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of such a diphenol may be advanced, provided that the epoxy equivalent weight is about 1000 or less, preferably about 250 or less and more preferably about 225 of less.

Suitable polyglycidyl ethers of polyphenols include those represented by structure (I)

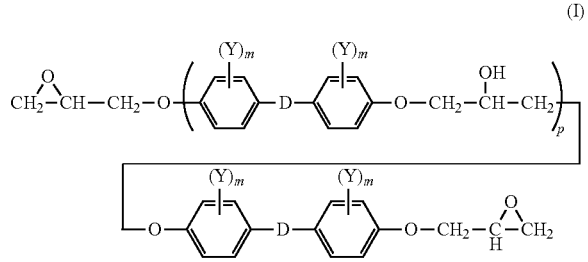

wherein each Y is independently a halogen atom; each m may be 0, 1, 2, 3 or 4; each D is a divalent hydrocarbon group suitably having from 1 to about 10, preferably from 1 to about 5, more preferably from 1 to about 3 carbon atoms, —S—, —S—S—, —SO—, —SO$_2$—, —CO$_3$—, —CO— or —O—; and p is a number such that the compound has an epoxy equivalent weight of up to 1000, preferably 170 to 500 and more preferably 170 to 225. Typically, p is from 0 to 1, especially from 0 to 0.5.

Fatty acid-modified polyglycidyl ethers of polyphenols, such as D.E.R.™ 3680 from The Dow Chemical Company, are useful epoxy resins.

Other useful polyglycidyl ethers of polyphenols include epoxy novolac resins. The epoxy novolac resin can be generally described as a methylene-bridged polyphenol compound, in which some or all of the phenol groups are capped with epichlorohydrin to produce the corresponding glycidyl ether. The phenol rings may be unsubstituted, or may contain one or more substituent groups, which, if present are preferably alkyl having up to six carbon atoms and more preferably methyl. The epoxy novolac resin may have an epoxy equivalent weight of about 156 to 300, preferably about 170 to 225 and especially from 170 to 190. The epoxy novolac resin may contain, for example, from 2 to 10, preferably 3 to 6, more preferably 3 to 5 epoxide groups per molecule. Among the suitable epoxy novolac resins are those having the general structure:

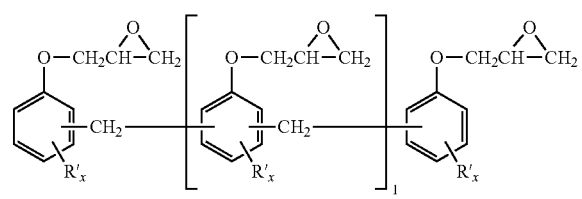

in which l is 0 to 8, preferably 1 to 4, more preferably 1 to 3, each R' is independently alkyl or inertly substituted alkyl, and each x is independently 0 to 4, preferably 0 to 2 and more preferably 0 to 1. R' is preferably methyl if present.

Other useful polyglycidyl ethers of polyphenol compounds include, for example, tris(glycidyloxyphenyl)methane, tetrakis(glycidyloxyphenyl)ethane, and the like.

Still other useful epoxy resins include polyglycidyl ethers of polyols, in which the epoxy equivalent weight is up to 1000, preferably up to 500, more preferably up to 250, and especially up to 200. These may contain 2 to 6 epoxy groups per molecule. The polyols may be, for example, alkylene glycols and polyalkylene glycols such as ethylene glycol, diethylene glycol, triethylene glycol, 1,2-propane diol, dipropylene glycol, tripropylene glycol and the like as well as higher functionality polyols such as glycerin, trimethylolpropane, trimethylolethane, pentaerythritol, sorbitol and the like. These preferably are used together with an aromatic epoxy resin such as a diglycidyl ether of a biphenol or an epoxy novolac resin.

Still other useful epoxy resins include tetraglycidyl diaminodiphenylmethane; oxazolidone-containing compounds as described in U.S. Pat. No. 5,112,932; cycloaliphatic epoxides; and advanced epoxy-isocyanate copolymers such as those sold commercially as D.E.R. 592 and D.E.R. 6508 (The Dow Chemical Company) as well as those epoxy resins described, for example, in WO 2008/140906.

Most desirably, epoxy compounds contain, on the average, at least one pendant or terminal 1,2-epoxy group (i.e., vicinal epoxy group) per molecule.

One preferable epoxy resin has general formula:

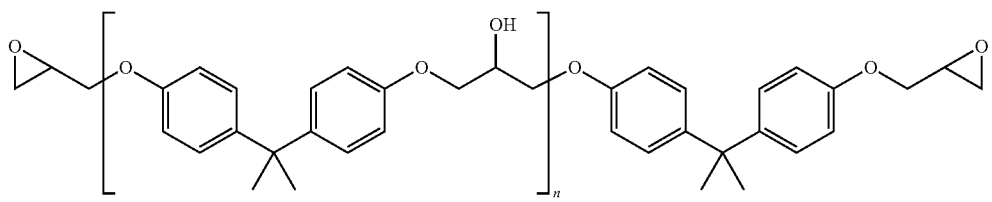

where n is generally in the range of 0 to about 25. Some basic liquid resins, e.g. D.E.R. 331, can have epoxy equivalent weights in the range of about 182 to 192 g/mol, and a viscosity (ASTM-D-445) of 11 to 14 Pa·sec. Others, such as D.E.R. 332, can have epoxy equivalent weights in the range of about 171 to 175 g/mol, and a viscosity (ASTM-D-445) of 4 to 6 Pa·sec. A preferred liquid epoxy resin, D.E.R. 383, has an epoxy equivalent weight in the range 176 to 183, and a viscosity (ASTM-D-445) of 9 to 10.5 Pa·sec at 25° C. Combinations of one or more liquid epoxy resin, optionally with one or more solid epoxy resin are included in the present invention. Combinations of one or more epoxy resin may be used to adjust properties of the epoxy adhesive and/or of resin portion A.

Epoxy resins that are liquid at room temperature (liquid epoxy resins) are preferred because they help to lower the viscosity of the highly viscous acrylate-capped polyurethane. When epoxy resins that are solid at room temperature (solid epoxy resins) are used, the amount should not be so great as to lead to excessive viscosity of resin portion A mixture.

The epoxy resin B) i) is present in the B-side in an amount of equal to or greater than 30 weight percent, preferably equal to or greater than 40 weight percent, and more preferably equal to or greater than 45 weight percent based on the total weight of the B-side. The epoxy resin B) i) is present in the B-side in an amount of equal to or less than 70 weight percent, preferably equal to or less than 60 weight percent, and more preferably equal to or less than 50 weight percent based on the total weight of the B-side.

The adhesive composition of the present invention comprises an initiator system that includes at least one bonding activator comprising an oxidizing agent in the B-side and at least one reducing agent in the A-side. This system is co-reactive at ambient conditions on mixture of Parts A and B to initiate addition polymerization reactions and cure the adhesive. Substantially any of the known oxidizing and reducing agents which are co-reactive at ambient conditions in air, can be employed.

The reducing agent is in the A-side at a typical suggested level of from 0.01 to 10, preferably 0.5 to 5, percent by weight, based on the total weight of A-side components.

Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine, diethanol-p-toluidine, dimethyl aniline, p-halogenated aniline derivatives and dimethyl-p-toluidine; and aminealdehyde condensation products, for example, the condensation products of aliphatic aldehydes such as butyraldelyde with primary amines such as aniline or butylamine.

The reducing agents are preferably tertiary amines Representative preferred reducing agents are illustrated by the structure:

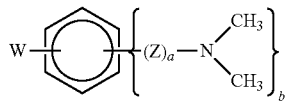

wherein Z is methylene; W is selected from the group consisting of hydrogen, hydroxy, amino, halogen, alkyl having 1 to 8, preferably 1 to 4, carbon atoms, and alkoxy having 1 to 8, preferably 1 to 4, carbon atoms; a is 0 or 1; and b is 1 or 2. Examples include N,N-dimethyl aniline and N,N-dimethylaminomethylphenol. N,N-dimethyl-p-toluidine is a preferred reducing agent.

The oxidizing agent is in the B-side at a typical suggested level of from 0.01 to 10, preferably 0.5 to 5, percent by weight, based on the total weight of B-side components.

Representative oxidizing agents including, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride. The most preferred oxidizing agent is benzoyl peroxide.

The bonding activator is present at from 0.5 to 50 percent by weight based on total weight of B-side and from 30 to 99.5 percent by weight, based on total weight of B-side can include a carrier vehicle. The carrier vehicles which are suitable for use in the bonding activators can be a simple inert solvent or diluent such as methylene chloride, or butyl benzyl phthalate, including mixtures of such solvents or diluents. The carrier vehicle should contain no more than 5 percent by weight of any moiety which is reactive with the oxidizing agent at room temperature. The carrier vehicle can be a more complex mixture including at least one film-forming binder in addition to inert solvent or diluent. The carrier vehicle can contain, in addition to solvent or solvent and film-forming binder, additives such as external plasticizers, flexibilizers, suspenders and, stabilizers, providing that any such additives do not unacceptably adversely affect the stability of the activator composition.

Other components may optionally be used in adhesives according to the present invention, such as fillers, adhesion promoters, pigments, thixotropic agents, wetting agents, reactive diluents, antioxidants, inhibitors, stabilizers, etc. Such other components may comprise part of the A-side and/or the B-side.

Fillers are generally added to adhesive formulations to balance properties such as viscosity mismatch (in case of 2K systems), to improve sag or mechanical performance, or to reduce the effective cost of the final formulation. In this hybrid system all of these factors can play a role in formulating the system.

When used, a filler preferably comprises part of the B-side. The B-side is generally lower in viscosity than A-side. Hence to improve the mixing efficiency, it will generally only be useful or necessary to fill the B-side. Preferred fillers include fumed silica, silane-treated talc, mica, feldspar, calcium carbonate, talc, wollastonite, and the like.

When used, fillers may be present in any useful amount, and can be determined by those of ordinary skill in the art using this document as guidance. Typically, fillers may be present in amounts equal to or greater than or 3 weight percent, preferably equal to or greater than or 5 weight percent, and more preferably equal to or greater than 10 weight percent based on the total weight of the side (i.e., A-side, B-side, or independently the total weight of each A-side and B-side if present in both sided) it is in. Typically, fillers may be present in amounts equal to or less than or 50 weight percent, preferably equal to or less than or 40 weight percent, and more preferably equal to or less than 30 weight percent based on the total weight of the side (i.e., A-side, B-side, or independently the total weight of each A-side and B-side if present in both sides) it is in.

Rheology modifiers, such as anti-sag agents, may be added to the system, preferably to B-side. A preferred anti-sag agent comprises silica, preferably fumed silica or carbon black. A preferred commercially available product includes CABOSIL™-720 (Cabot Corporation). The rheology modifier may be solely in the A-side, solely in the B-side, or in both the A-side and the B-side.

Preferably, the rheology modifier will be present in an amount in the range from about 0.5 to 10 percent by weight, preferably 1 to 7 percent by weight, more preferably 2 to 5 percent by weight based on the total weight of the side (i.e., A-side, B-side, or independently the total weight of each A-side and B-side if present in both sides) it is in.

Preferably, the stabilizer will be present in an amount in the range from about 0.05 to 2 percent by weight, preferably 0.1 to 1 percent by weight, more preferably 0.2 to 0.5 percent by weight based on the total weight of the A-side. Suitable stabilizers include methyl ether of hydroquinone, hydroquinone, benzoquinone, naphthoquinone hydroxyl amine, and nitrile oxides. A preferred stabilizer is butylated hydroxytoluene.

The components of the A-side may be mixed together into a single composition, but may be kept separate until just prior to use. Similarly, the components of B-side may be mixed together into a single composition, but may be kept separate until just prior to use. For ease of processing and use, as well as for commercial purposes, it is preferred that all components of the A-side are combined in a single composition, and that all components of the B-side are combined in a single composition.

EXAMPLES

In Comparative Examples A and B and Example 1, the following raw materials are used as received except where noted otherwise:

"MMA" is methyl methacrylate monomer available from Sigma-Aldrich;

"CN9009" is an aliphatic urethane acrylate oligomer having a Tg of 40° C. available as CN9009 from Sartomer:

"CN9782" is an aromatic urethane acrylate oligomer having a Tg of −32° C. available as CN99782 from Sartomer;

"MBS" is a methacrylate-butadiene-styrene copolymer available as PARALOID™ BTA-753(ER) from The Dow Chemical Company;

"MAA" is methacrylic acid available from Sigma-Aldrich;

"DMPT" is N,N-dimethyl-p-toluidine available from Sigma-Aldrich;

"QM-1326AP" is a phosphated acrylic monomer available as QM-1326AP from The Dow Chemical Company;

"AFR40" is benzoyl peroxide 40 weight percent in dibutyl phthalate available as LUPEROX™ AFR40 from Arkema, Inc.;

M200" is a particulate wollastonite available as NYAD™ M200 from Nyco;

"D.E.R. 331" is a liquid diglycidyl ether of bisphenol A available as D.E.R.™ 331 Epoxy Resin from The Dow Chemical Company;

"TS720" is a medium surface area fumed silica which has been surface modified with polydimethylsiloxane available as CAB-O-SIL™ TS720 from Cabot Corporation; and "BHT" is butylated hydroxytoluene available from Sigma-Aldrich.

Comparative Examples A and B and Example 1 are two-component adhesive composition comprising an A-side and a B-side with the compositions described in Table 1, amounts are in weight percent based on the total weight of the side the components are in.

The following procedure is followed to prepare the A-side and B-side using a dual asymmetric centrifugal FLACKTEK SPEEDMIXER™ DAC 400 FVZ from Hauschild Engineering:

A-Side.
1. Add the MBS and MMA in a 1:2 ratio to a speed mixing cup and mix for 4 minutes at 2300 rotations per minute (rpms).
2. Add the remaining MMA, stir by hand with a tongue depressor, then speed mix for 2 minutes at 2300 rpms.
3. Add the urethane acrylates, MAA, TS720, and QM 1326AP to the cup and mix for 2 minutes at 2300 rpms. Scrape down the sides of the cup with a tongue depressor and mix for an additional 2 minutes at 2300 rpms.
4. Add the DMPT to the mixing cup and mix for 1 minute at 2100 rpms, scrape down the sides of the cup with a tongue depressor, then mix for an additional minute at 2100 rpms.

B-Side.
1. Add the epoxy resin and BHT to a speed mixing cup and heat for one hour at 80° C. to dissolve the BHT.
2. Add the TS720 and wollastonite and speed mix for 2 minutes at 2100 rpms. Scrape down the sides of the cup with a tongue depressor then mix for an additional 2 minutes at 2100 rpms.
3. Add the peroxide to the mixing cup and mix for 30 seconds at 1200 rpms followed by an additional 2 minutes of mixing at 2100 rpms.

T-Peel Testing.

The examples are subjected to T-peel testing on two substrates. T-Peel samples are prepared by bending 1 inch by 4 inch metal strips at a 90° angle yielding a 3 inch bonding section. The substrate is wiped with acetone. The two components of the adhesive are combined in a 4:1 (A-side: B-side) ratio by weight and mixed by hand in a bag for 1 minute. The adhesive is then applied to one strip and 10 mil glass bead spacers are sprinkled on the adhesive. A second strip is placed on the adhesive to create the T-Peel joint assembly. The assembly is held with clips and cured at room temperature for 24 hours. After curing the samples are tested on an INSTRON™ at a pull rate of 2 inches per minute to develop a load curve. The average load is taken to give the pounds of force per linear inch of substrate.

The results wherein the substrate is plasma treated coated steel (0.4 mm thick) are reported in Table 2. The results wherein the substrate is electrogalvanized steel (0.77 mm thick) are reported in Table 3.

TABLE 1

|  | Com. Ex. A Weigh % | Comp. Ex. B Weight % | Example 1 Weight % |
|---|---|---|---|
| A-side |  |  |  |
| MMA | 53.0 | 58.0 | 48.0 |
| CN9009 | 2.5 | 15.0 | 15.0 |
| CN9782 | 2.5 | 15.0 | 15.0 |
| MBS | 30.0 | 0.0 | 10 |
| MMA | 2.5 | 2.5 | 2.5 |
| DMPT | 2.5 | 2.5 | 2.5 |
| QM 1326AP | 3.0 | 3.0 | 3.0 |
| TS720 | 4.0 | 4.0 | 4.0 |
| Total | 100.00 | 100.00 | 100.00 |
| B-side |  |  |  |
| AFR40 | 7.5 | 7.5 | 7.5 |
| TS720 | 1.00 | 1.00 | 1.00 |
| Wollastonite | 46.25 | 46.25 | 46.25 |
| D.E.R. 331 | 45.00 | 45.00 | 45.00 |
| BHT | 0.25 | 0.25 | 0.25 |
| Total | 100.00 | 100.00 | 100.00 |

TABLE 2

|  | Failure Mode | T-peel, pli |
|---|---|---|
| Com. Ex. A | CF - no cure | 0 |
| Com. Ex. B | TFCF - slow cure | 1.4 |
| Example 1 | CF | 39.7 |

CF = cohesive failure
TFCF = thin film cohesive failure

TABLE 3

|  | Failure Mode | T-peel, pli |
|---|---|---|
| Com. Ex. A | CF - no cure | 0 |
| Com. Ex. B | TFCF/CF - slow cure | 11.9 |
| Example 1 | CF | 51.9 |

CF = cohesive failure
TFCF = thin film cohesive failure

What is claimed is:

1. A two-component adhesive composition comprising an A-side and a B-side:
   A) the A-side comprising:
      i) a) an acrylate-capped polyurethane having a Tg equal to or greater than 20° C.,
      i) b) an acrylate-capped polyurethane having a Tg equal to or less than −20° C.,
      ii) a core/shell graft copolymer,
      iii) a phosphorous compound with mono-esters of phosphonic or mono- and diesters of phosphonic and phosphoric acids having one unit of vinyl or allylic unsaturation present,
      iv) an olefinically-unsaturated carboxylic acid,
      v) an olefinically-unsaturated carboxylic acid ester, and
      vi) a reducing agent and
   B) the B-side comprising:
      i) an epoxy resin
      ii) a oxidizing agent,
      iii) a stabilizer, and
      iv) a filler.

2. The adhesive composition of claim 1 further comprising vii) a rheology modifier in the A-side, in the B-side, or in both the A-side and B-side.

3. The adhesive composition of claim 1 wherein the acrylate-capped polyurethane A) i) is obtained by reacting a polyol with a multifunctional isocyanate to complete reaction of the isocyanate to obtain a pre-polymer, and capping the pre-polymer with acrylate groups.

4. The adhesive composition of claim 1 wherein the epoxy resin B) i) comprises a liquid epoxy resin.

* * * * *